Patented Mar. 10, 1936

2,033,341

UNITED STATES PATENT OFFICE 2,033,341

COMPLEX CHROMIUM COMPOUNDS OF ORTHO-HYDROXYAZO DYESTUFFS AND THEIR PRODUCTION

Hans Krzikalla, Ludwigshafen-on-the-Rhine, and Walther Kuehne, Mannheim, Germany, assignors to General Aniline Works, Inc., New York, N. Y., a corporation of Delaware No Drawing. Application May 27, 1933, Serial No. 673,306. In Germany June 4, 1932

9 Claims. (Cl. 260—12)

The present application relates to new complex chromium compounds of ortho-hydroxyazo dyestuffs and a process of producing same.

We have found that valuable complex chromium compounds of ortho-hydroxyazo dyestuffs are obtained by coupling the diazonium derivatives of compounds corresponding to the following formula

wherein X stands for a benzene or naphthalene radicle, A for an alkyl or acyl group and each Z for hydrogen or an alkyl, cycloalkyl, aralkyl or aryl radicle and wherein the OA-group and the NH$_2$-group are fixed to X in ortho-position to one another, with coupling components containing at least one sulphonic group, the resulting dyestuffs being treated with agents supplying chromium under conditions under which splitting off of the radicle A takes place. In this manner dyestuffs of good levelling power and which on animal fibres such as wool, silk and leather yield dyeings especially fast to light and washing are obtained. The dyestuffs may be used for dyeing as well as for printing. Sulphamides of ortho-aminophenol or ortho-aminonaphthol ethers or esters the diazo compounds of which are to be used may contain further substituents such as further alkoxy groups, halogen, alkyl or nitro groups. The phenolic hydroxyl groups may be etherified with aliphatic alcohols to form methyl or ethyl ethers or they may be esterified with carboxylic or sulphonic acids. As the radicle A is split off from the phenolic hydroxyl group during the reaction, it is, of course, preferable to use initial materials as are available most readily; for this reason in most cases the methyl ethers of the compounds in question are used; ethyl ethers and the like may, however, be used with a similar effect. It is advantageous to carry out the treatment of dyestuffs derived from ethers of the kind defined above in acid media. If dyestuffs derived from esters, such as toluenesulphonic acid esters, are used the treatment with agents supplying chromium is preferably effected in media having an alkaline reaction.

One or both hydrogen atoms of the sulphamido radicle contained in the diazo compound, which may occupy any position in relation to the diazo group, may be substituted by alkyl, cycloalkyl, aralkyl or aryl radicles.

The coupling components containing at least one sulphonic group may be of any kind. Naphtholsulphonic acids give very satisfactory results. According to the different components dyestuffs yielding different shades, for example yellow, Bordeaux or blue shades, can be obtained.

The conversion of the azo dyestuffs into the complex chromium compounds is carried out by known methods under such conditions that a splitting off of alkyl or acyl radicles from the hydroxyalkyl or hydroxyacyl groups takes place.

The treatment is effected by heating the azo dyestuffs with agents supplying chromium in the presence of water at temperatures between about 100° and 150° C. When the reaction is carried out at higher temperatures being within this range the reaction proceeds more readily; therefore the use of temperatures above 100° C. and working under pressure is advantageous. The process may be carried out for example as indicated in Patent No. 1,765,680. Suitable agents supplying chromium are for example aqueous solutions of chromium fluoride, chromium formate, chromium sulphate, chromium alum or alkaline chromite solutions.

The ortho-hydroxyazo dyestuffs may be first prepared from the dyestuffs, the former being treated with agents supplying chromium.

The following examples will further illustrate the nature of this invention, but the invention is not restricted to these examples. The parts are by weight.

*Example 1*

258 parts of 2-amino-1-anisol-4-sulphodiethylamide (obtainable by converting 2-nitro-1-anisol-4-sulphonic acid into the sulphonic acid chloride, preparing from the latter the corresponding sulphodiethylamide by treatment with diethylamine and reducing the nitro group) are diazotized in the usual manner and coupled with a solution rendered alkaline with sodium carbonate, of 330 parts of 2-naphthol-6,8-disulphonic acid. The dyestuff, separated by the addition of common salt, dyes wool level very brilliant orange shades having high fastness to light.

In order to prepare the complex chromium compound from the azo dyestuff, the latter is heated in an autoclave for about 3 hours at 135° C. with an aqueous solution of chromium sulphate or chromium formate containing 60 parts of chromium, preferably while stirring. When the chroming is completed, the dyestuff solution is evaporated to dryness; the dyestuff may also be deposited from its solution by the addition of hydrochloric or sulphuric acid. The dyestuff thus obtained dyes wool beautiful bluish Bordeaux red shades. In addition to great levelness, the dyeing is distinguished by very good fastness to light and washing; the dyestuff does not dye cotton or viscose artificial silk.

*Example 2*

Shades of color similar to those obtained with the dyestuff described in Example 1 are obtained by employing instead of the diazo component described in Example 1 the 2-amino-1-anisol-4-sulphamides in which the amido group is substituted by one ethyl or by one or two methyl groups or by two phenyl groups and working otherwise in the same manner as set forth in the said example. (2-amino-1-anisol-4-sulphodiphenylamide can be obtained by converting 2-nitro-1-anisol-4-sulphonic acid into the chloride, preparing from the latter the corresponding diphenylamide by treatment with diphenylamine and reducing the nitro group. When using the compound thus formed a dyestuff is obtained which dyes silk very well.) 5-chlor-2-amino-1-anisol-4-sulphamide (obtainable by acetylating 5-chlor-2-amino-1-anisol, converting the acetylation product obtained into the sulphochloride by means of chloro sulphonic acid, preparing therefrom the corresponding amide by means of aqueous ammonia and saponifying the acetyl amino sulphamide) may be used as diazo component with a similar effect. Similar shades of color are also obtained by employing 2-naphthol-8-sulphonic acid as the coupling component in combination with the diazo compounds described in the preceding example and in this paragraph of the present example.

The dyestuffs listed in the following table, for example, may also be prepared in a corresponding manner. One method suitable for preparing diazo components of the type to be used according to the present invention consists in starting with the corresponding sulphonic acids containing a nitro group instead of the amino group, preparing therefrom sulphochlorides, converting the latter into sulphamides by treatment with ammonia or the appropriate amine and reducing the nitrosulphamides to form the aminated sulphamides. The diazo components may be prepared also according to other methods as indicated in the first column of the table.

| Dyestuff from | Shade | Shade of chromium compound |
|---|---|---|
| Diazotized 5-chlor-2-amino-1-anisol-4-sulphamide and 1-(meta-sulphophenyl)-3-methyl-5-pyrazolone. | Yellow | Orange. |
| Diazotized 4-chlor-2-amino-1-anisol-5-sulphamide (obtainable by acetylating 4-chlor-2-amino-1-anisol, preparing the sulphochloride by means of chlorosulphonic acid, acting on the sulphochloride with aqueous ammonia and saponifying the acetyl amino sulphamide with dilute caustic soda solution) and 1-(meta-sulphophenyl)-3-methyl-5-pyrazolone. | Yellow | Red. |
| Diazotized 2-amino-1-anisol-4-sulphamide and 2,4-dihydroxy-quinoline-6-sulphonic acid (obtainable by melting N-acetyl-5-sulpho-anthranilic acid with caustic alkali at above 200° C., N-acetyl-5-sulphoanthranilic acid may be prepared by sulphonating anthranilic acid at between 100 and 150° C. by means of 23 per cent fuming sulphuric acid and acetylating the 2-amino-5-sulpho-benzoic acid by means of acetic acid anhydride in the usual manner). | Yellow brown | Rose red. |
| Diazotized 5-methoxy-2-amino-1-anisol-4-sulphamide (obtainable by acetylating 2-amino-1,5-resorcin dimethyl ether, treating with chlorosulphonic acid, converting the sulphochloride obtained by means of aqueous ammonia into the acetyl aminosulphamide and saponifying the latter with dilute caustic soda solution) and 2,3,6-naphtholdisulphonic acid. | Bordeaux red | Red violet. |
| Diazotized 4-chlor-2-amino-1-anisol-5-sulpho-diethylamide (prepared as described in Example 2 of the table while using diethylamine instead of ammonia) and 2,6,8-naphthol disulphonic acid. | Bright red | Violet. |
| Diazotized 4-chlor-2-amino-1-anisol-5-sulpho-diethylamide (see the preceding example) and 2,3,6-naphthol disulphonic acid. | Red | Blue violet. |
| Diazotized 2-aminohydroquinone dimethyl ether-5-sulphamide (obtainable by acetylating 2-amino-1,4-hydroquinone dimethyl ether, treating the acetyl product with chlorosulphonic acid, converting the sulphochloride obtained with aqueous ammonia into the acetylaminosulphamide and saponifying the latter by means of dilute caustic soda solution) and 2,6,8-naphthol disulphonic acid. | Bordeaux red | Blue. |
| Diazotized 2-aminohydroquinone dimethylether-5-sulphodiethylamide (obtainable in a corresponding manner as described in the preceding example while using diethyl amine instead of ammonia) and 2,3,6-naphthol disulphonic acid. | Crimson red | Blue. |
| Diazotized 4-chlor-2-amino-1-anisol-5-sulphamide (see Example 2 of this table) and 2,4-naphthol sulphonic acid. | Bordeaux red | Blue. |
| Diazotized 5-methoxy-2-amino-1-anisol-4-sulphamide (see Example 4 of this table) and 2,8-dihydroxynaphthalene-6-sulphonic acid. | Bordeaux red | Blue green. |
| Diazotized 2-amino-1-anisol-4-sulphodiethylamide and 8-hydroxy-quinoline-5-sulphonic acid. | Red | Yellow brown. |
| Diazotized 1-amino-2-naphthol-methylether-6-sulphodiethyl-amide and 1,4,8-naphtholdisulphonic acid. | Violet red | Blue. |
| Diazotized 1-amino-2-naphthol-methylether-6-sulphodiethyl-amide and 1-naphthol-8-sulphamide-3-sulphonic acid. | Red violet | Green blue. |
| Diazotized 1-amino-2-naphthol-methylether-6-sulphodiethyl-amide and 1-naphthol-4-sulpho-diethylamide-8-sulphonic acid (obtainable by converting 1-naphthol-4-sulphonic acid or its toluene sulphonic acid ester into the sulphonic acid amide by way of the sulphochloride and sulphonating the sulphamide obtained). | Violet | Green blue. |

What we claim is:—

1. Complex chromium compounds of ortho-hydroxyazo dyestuffs corresponding to the general formula:

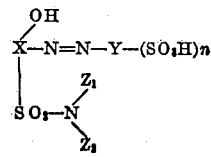

wherein X stands for a benzene or naphthalene radicle, Y for the radicle of a coupling compound selected from the group consisting of hydroxynaphthalenes, hydroxyquinolines, and pyrazolones, $Z_1$ stands for alkyl, $Z_2$ for hydrogen or alkyl, $n$ for a whole number and wherein the —OH and the —N=M— groups are fixed to X in ortho-position to one another.

2. Complex chromium compounds of ortho-hydroxyazo dyestuffs corresponding to the general formula:

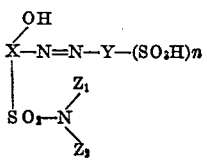

wherein X stands for a benzene or naphthalene radicle, Y for the radicle of a coupling compound selected from the group consisting of hydroxynaphthalenes, hydroxyquinolines, and pyrazolones, $Z_1$ stands for alkyl, $Z_2$ for hydrogen or alkyl, $n$ for a whole number from 1 to 2 and wherein the —OH and the —N=N— groups are fixed to X in ortho-position to one another.

3. Complex chromium compounds of the ortho-hydroxyazo dyestuffs corresponding to the general formula

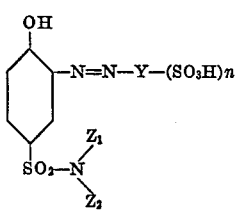

wherein Y stands for the radicle of a coupling compound selected from the group consisting of hydroxynaphthalenes, hydroxyquinolines, and pyrazolones, $Z_1$ stands for alkyl, $Z_2$ for hydrogen or alkyl and $n$ for a whole number.

4. Complex chromium compounds of the ortho-hydroxyazo dyestuffs corresponding to the general formula

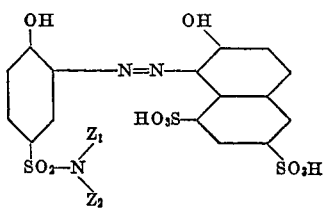

wherein $Z_1$ stands for alkyl and $Z_2$ for hydrogen or alkyl.

5. The complex chromium compound of the ortho-hydroxyazo dyestuff corresponding to the formula

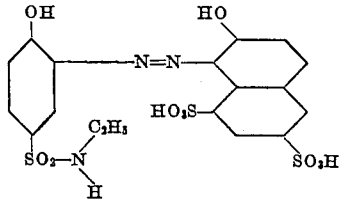

6. The complex chromium compound of the ortho-hydroxyazo dyestuff corresponding to the formula

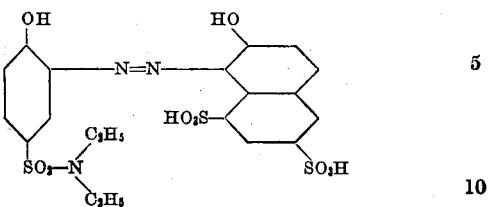

7. The complex chromium compound of the ortho-hydroxyazo dyestuff corresponding to the formula

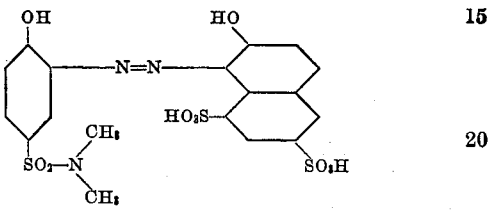

8. The process of producing complex chromium compounds of ortho-hydroxyazo dyestuffs which comprises heating a compound corresponding to the general formula

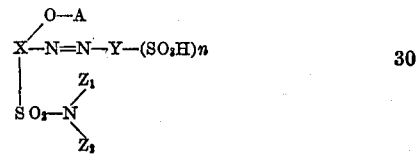

wherein A stands for an alkyl or acyl radicle, X for a benzene or naphthalene radicle, Y for the radicle of a coupling compound selected from the group consisting of hydroxynaphthalenes, hydroxyquinolines, and pyrazolones, $Z_1$ stands for alkyl, $Z_2$ for hydrogen or alkyl, $n$ for a whole number and wherein the —O—A and the —N=N— groups are fixed to X in ortho-position to one another, in the presence of water at temperatures between about 100° and 150° C. with an agent supplying chromium.

9. The process of producing complex chromium compounds of ortho-hydroxyazo dyestuffs which comprises heating a compound corresponding to the general formula

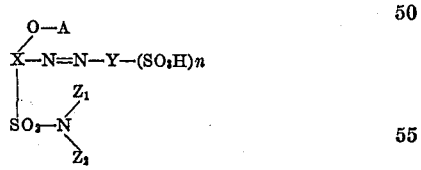

wherein A stands for an alkyl or acyl radicle, X for a benzene or naphthalene radicle, Y for the radicle of a coupling compound selected from the group consisting of hydroxynaphthalenes, hydroxyquinolines, and pyrazolones, $Z_1$ stands for alkyl, $Z_2$ for hydrogen or alkyl, $n$ for a whole number and wherein the —O—A and the —N=N— groups are fixed to X in ortho-position to one another, in the presence of water at temperatures between about 100° and 150° C. with an agent supplying chromium under elevated pressure.

HANS KRZIKALLA.
WALTHER KUEHNE.